United States Patent [19]

Cunningham

[11] Patent Number: 5,031,859
[45] Date of Patent: Jul. 16, 1991

[54] LIFT-PRODUCING MACHINE OR DEVICE

[76] Inventor: John T. Cunningham, 3559 High Mesa, Dallas, Tex. 75234

[21] Appl. No.: 385,184

[22] Filed: Jul. 26, 1989

[51] Int. Cl.⁵ .............................................. B64C 29/00
[52] U.S. Cl. .................................. 244/12.1; 244/73 B; 244/207
[58] Field of Search ................. 244/23 R, 23 B, 23 C, 244/73 B, 73 C, 12.1, 207

[56] References Cited

U.S. PATENT DOCUMENTS

| | | | |
|---|---|---|---|
| 1,776,994 | 9/1930 | Chattin | 244/12.2 |
| 1,931,753 | 10/1933 | Darbyson | 244/12.2 |
| 2,547,266 | 4/1951 | Hoglin | 244/12.2 |
| 2,718,364 | 9/1955 | Crabtree | 244/12.2 |
| 2,726,829 | 12/1955 | Hillis | 244/12.2 |
| 2,801,058 | 7/1957 | Lent | 244/12.2 |
| 2,843,338 | 7/1958 | Streib | 244/12.2 |
| 2,876,964 | 3/1959 | Streib | 244/12.2 |
| 2,927,746 | 3/1960 | Mellen | 244/12.2 |
| 2,947,496 | 8/1960 | Leggett | 244/12.2 |
| 2,978,206 | 4/1961 | Johnson | 244/23 C |
| 2,988,303 | 6/1961 | Coanda | 244/23 C |
| 2,991,961 | 7/1961 | Rogallo et al. | 244/207 |
| 2,996,266 | 8/1961 | Rebasti | 244/12.2 |
| 3,237,888 | 3/1966 | Willis | 244/23 C |
| 3,297,278 | 1/1967 | Hawkins | 244/23 R |
| 3,387,456 | 6/1968 | Feder et al. | 244/23 B |
| 3,469,802 | 9/1969 | Roberts et al. | 244/12.2 |
| 3,592,413 | 7/1971 | Thompson | 244/12.2 |
| 3,612,445 | 10/1971 | Phillips | 244/12.2 |
| 3,697,020 | 10/1972 | Thompson | 244/12.2 |
| 3,831,884 | 8/1974 | Schellin | 244/12.2 |
| 4,193,568 | 3/1980 | Heuvel | 244/23 C |
| 4,248,041 | 2/1981 | Wilde et al. | 244/23 D |

FOREIGN PATENT DOCUMENTS

| | | | |
|---|---|---|---|
| 0811422 | 7/1949 | Fed. Rep. of Germany | 244/23 R |
| 1212391 | 3/1960 | France | 244/12.1 |
| 1281518 | 12/1961 | France | |

*Primary Examiner*—Michael J. Carone
*Attorney, Agent, or Firm*—Shlesinger Arkwright & Garvey

[57] ABSTRACT

A thrust-producing device comprises a body having a surface and a periphery and disposed in a first fluid; a generator for imparting energy to a second fluid; and a distributor connected to the generator, disposed adjacent the surface, for distributing the second fluid in a first stream over and adjacent the surface for blanketing and enclosing at least a portion of the surface with the first stream and causing the first stream to be initially sufficiently unattached to the surface to define a closed volume between the surface and the first stream. The distributor imparts sufficient velocity to the first stream for permitting a substantial portion of the first stream to reach beyond at least a portion of the body periphery and to partially evacuate by entrainment the volume and to create a low pressure within the volume relative to a pressure of the first fluid and to generate a second stream within the volume; whereby at least a substantial portion of the first stream is deflected angularly and around at least a portion of the body by the dynamic interaction of the first stream with the first fluid and the second stream and the low pressure within the closed volume, and whereby the at least a substantial portion of the first stream entrains a portion of the first fluid to produce a combined resultant fluid flow which proceeds angularly and around at least a portion of the body, thereby creating a resultant thrust force acting on the body.

A method for producing thrust for a body is also disclosed.

44 Claims, 3 Drawing Sheets

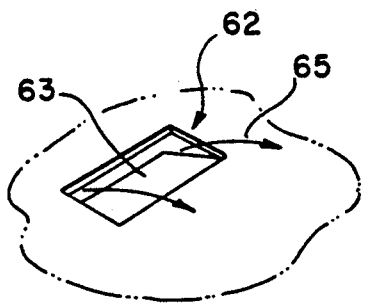
FIG. 7
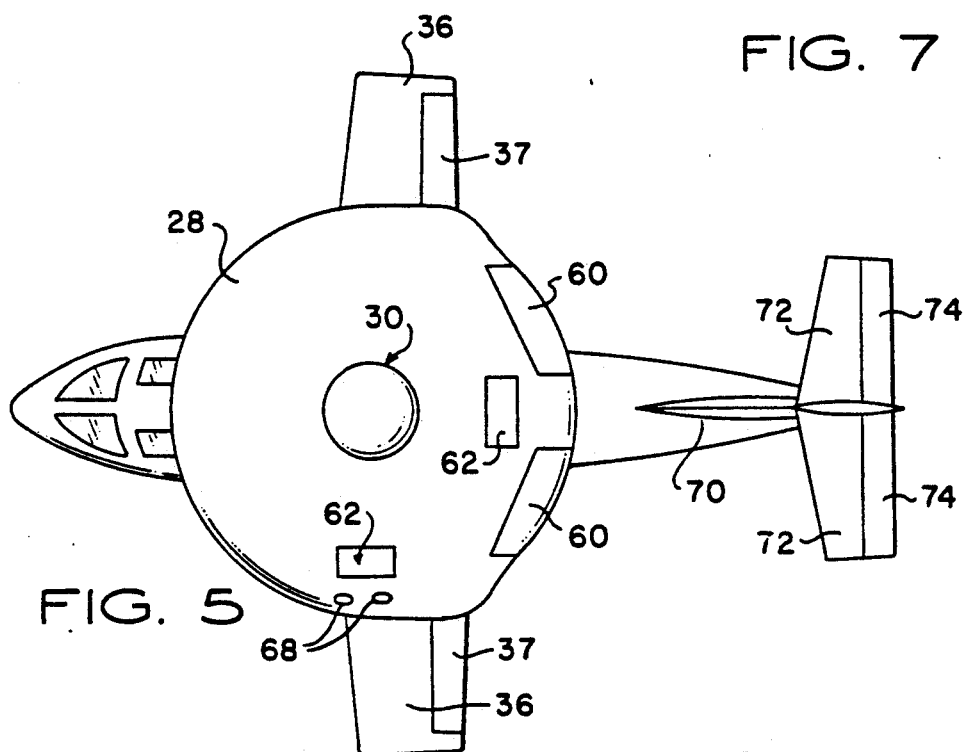
FIG. 5
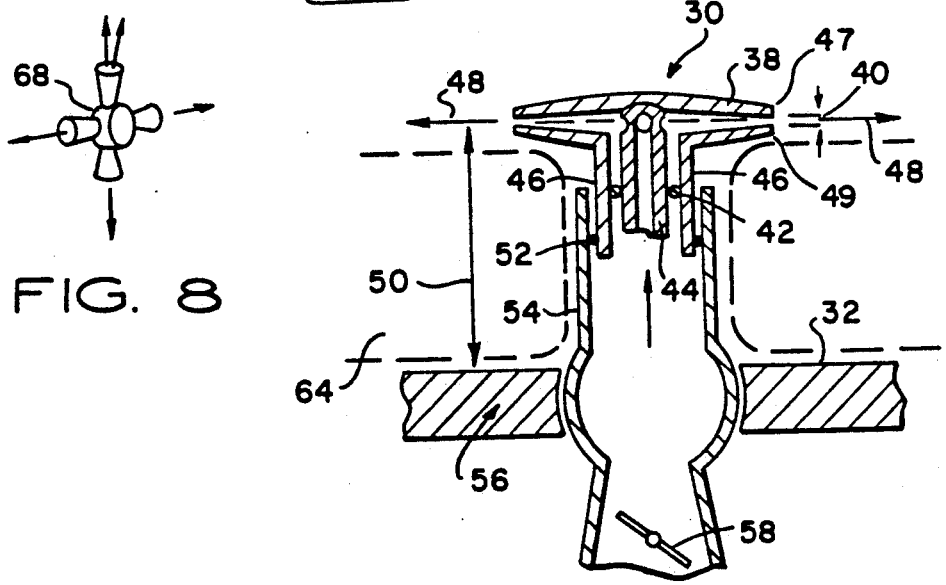
FIG. 8
FIG. 6

5,031,859

LIFT-PRODUCING MACHINE OR DEVICE

FIELD OF THE INVENTION

The present invention relates to a machine or device for providing vertical lift to an aircraft.

BACKGROUND OF THE INVENTION

Prior inventions have described the method of obtaining lift by utilizing a gas flowing approximately radially along the upper surface of a disc-shaped body. Such lift is derived from the difference in the reduced pressure in the gas flow over the surface and the local atmospheric pressure below. These inventions have described various means of producing a streamlined, attached fluid flow about the surface of a body to obtain lift in the manner of Bernoulli's principle. Others have included descriptions of various vanes or flow deflectors or similar type effect of inducing the surface flow to follow surface contours to add momentum thrust to the pressure differential lift.

OBJECTS AND SUMMARY OF THE INVENTION

It is an object of the present invention to provide a device for producing a fluid flow in a fluid environment.

It is another object of the present invention to provide a device for generating lift or thrust acting upon a body by producing adjacent a surface of the body an area of pressure lower than the ambient pressure acting on the opposing surfaces of the body.

It is yet another object of the present invention to provide a device for deflecting the direction of fluid flow and providing thrust in the opposite direction of the deflected fluid flow.

It is another object of the present invention to provide a device for deflecting fluid flow without the use of physical deflectors.

It is yet another object of the present invention to induce flow from the ambient fluid envelope, producing a thrust component opposite the direction of the induced flow.

It is still another object of the present invention to provide a device for providing vertical lift to an aircraft.

It is another object of the present invention to provide a device for generating lift or thrust force to an aircraft or other body.

It is still further another object of the present invention to provide vertical take-off and landing capability to an aircraft.

It is yet another object of the present invention to provide a device for providing lift in the manner of a helicopter, but without the hazards associated with rotating surfaces.

It is another object of the present invention to provide a device for providing lift in the manner of a helicopter without rotating parts in the airstream exterior to the device.

It is still another object of the present invention to provide a device for permitting an aircraft to operate in the manner of a helicopter without rotating surfaces and the attendant hazards associated therewith.

It is still another object of the present invention to provide a device for permitting an aircraft to operate in essentially the same manner as a helicopter without the mechanical and operational complexities associated with rotary-winged aircraft.

It is yet another object of the present invention to provide a device for producing lift or thrust acting on a body with the lift or thrust force being well dispersed about the body so as to provide a more stable platform.

In summary, the present invention provides a thrust-producing device comprising a body having a surface and a periphery and disposed in a first fluid; a generator for imparting energy to a second fluid; and a distributor operably associated with the generator, disposed adjacent the surface, for distributing the second fluid in a first stream over and adjacent the surface for blanketing and enclosing at least a portion of the surface with the first stream and causing the first stream to be initially sufficiently unattached to the surface to define a substantially closed volume between at least a portion of the surface and the first stream. The second fluid may be obtained from the surrounding first fluid or may be another fluid. The distributor imparts sufficient velocity or impetus to the first stream for permitting a substantial portion of the first stream to reach beyond at least a portion of the body periphery and to partially evacuate by entrainment the volume and to create a low pressure within the volume relative to a pressure of the first fluid and to generate a second stream within the volume; whereby at least a substantial portion of the first stream is deflected angularly and around at least a portion of the body by the dynamic interaction of the first stream with the first fluid and the second stream and the low pressure within the volume, and whereby the at least a substantial portion of the first stream entrains a portion of the first fluid to produce a combined resultant fluid flow which proceeds angularly and around at least a portion of the body, thereby creating a resultant thrust force acting on the body.

A method for producing thrust for a body is also disclosed.

DESCRIPTIONS OF THE DRAWINGS

FIG. 5 is a top view of the aircraft from FIG. 4, showing optional additional wing surfaces.

FIG. 6 is a fragmentary, side elevational view in cross-section of one method of flow distribution means of the present invention, as used in an aircraft shown in FIG. 4.

FIG. 7 is a fragmentary, perspective view of a control orifice for controlling the fluid flow geometry generated by the present invention as used in an aircraft shown in FIG. 4.

FIG. 8 is schematic, perspective view of a reaction motor gas jet used for control purposes in an aircraft shown in FIG. 4.

DETAILED DESCRIPTION OF THE INVENTION

FIGS. 1, 2 AND 3

Figure 1:
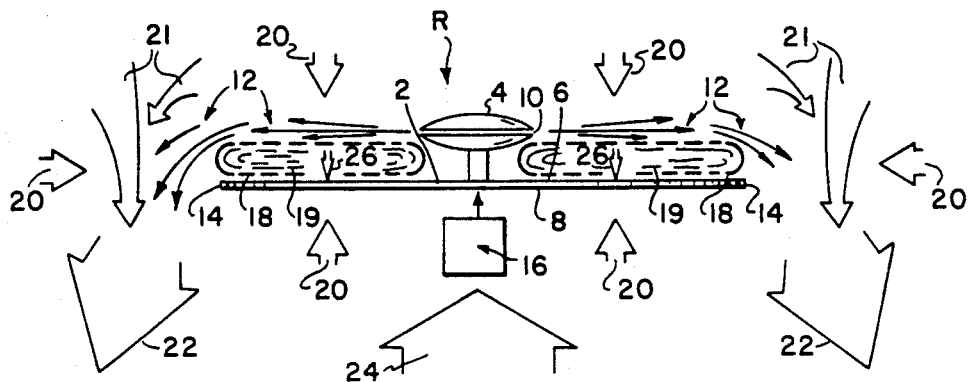
FIG. 1 shows a schematic, side elevational view of the present invention.

A simple embodiment of a lift-producing device R includes a horizontally disposed body 2 and a nozzle body 4 on an upper surface 6 thereof, as best shown in FIG. 1. The body 2 includes a lower surface 8.

The nozzle body 4 has an outlet 10 for directing a primary gas flow or stream 12 outwardly toward the periphery 14 of the body 2. A gas generator 16, having conventional design, provides gas with sufficient energy and mass flow rate for the flow 12. The gas generator 16 may be a combustion engine, compressor, pump, or other devices for generating a gas flow of sufficient mass, energy and velocity. The gas comprising this flow may be the same as the that comprising the ambient environment or may be another gas. The flow generator 16 and the flow distribution nozzle body 4 operate co-operatively to provide a flow with sufficient velocity, energy and momentum (mass and velocity) to reach beyond the periphery 14 and to partially evacuate by entrainment a closed volume 18 generally indicated in phantom lines and defined between the upper surface 6 and the gas flow 12. The closed volume 18 is substantially closed to the surrounding atmosphere 20 by the body 2 and the encompassing gas flow 12 such that low pressure develops within the closed volume 18 from the entraining action of the gas flow 12.

The outlet 10 is positioned above the upper surface 6 such that the gas flow 12 over the surface 6 is initially sufficiently unattached thereto, but remains within sufficient proximity thereto to entrain a portion of the region of gas positioned within the closed volume 18 to thereby create a pressure therein lower than ambient and to create a flow circulation 19 which is substantially bounded by the closed volume 18.

It should be understood by a person skilled in the art that the nozzle body 4 includes other means for generating, initiating and/or distributing a fluid flow, such as simple flow distributing orifices, a gas generator physically integrated into the nozzle body, a combined centrifugal impeller and compressor, slots, holes, etc.

The dynamic interaction between the primary gas flow 12, the surrounding gas generally indicated by arrows 20, and the flow 19 created within the lower pressure region within the closed volume 18, serves to deflect a substantial portion of the primary flow 12 angularly and through the imaginary projection of the upper surface 6 in a downward direction in its egress beyond the periphery 14 of the body 2, as best shown in FIG. 1. The primary flow 12 entrains gas from the surrounding atmosphere 20, thereby increasing the total mass flow. The resultant net flow 22, consisting of deflected gas of primary flow 12, entrained flow from the closed volume 18, and additional flow 21 entrained from the surrounding atmosphere, proceeds in a substantially downward direction, away from the device R, thereby producing an opposing upward mass reaction thrust force generally indicated at 24. The net lifting effect on the body 2 is a combination of the reaction force 24 and the pressure differential between the lower than ambient pressure 26 acting on the upper surface 6 and the ambient pressure 20 acting on lower surface 8.

The net lifting effect on the body 2 is a function of various variables, including the thermodynamic characteristics (energy, temperature, pressure, mass flow rate, velocity, etc.) of the primary gas flow 12, the geometry of the closed volume 18, the height of the gas flow 12 above the surface 6, the inclination of the gas flow 12 relative to the surface 6, and the dynamic interaction of the gas flow 12 relative to the surrounding atmosphere 20 and the gas in the volume 18.

Figure 2:
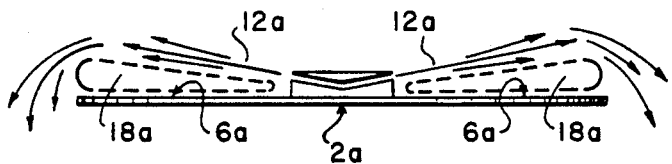
FIGS. 2 and 3 show schematic, side elevational views of other embodiments of the present invention.
Figure 3:
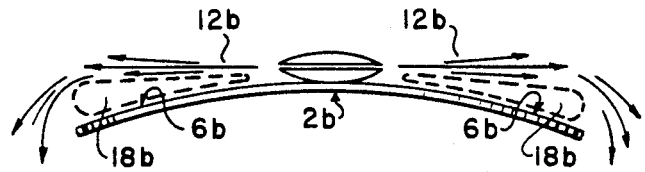

Preferably, the gas flow 12 is substantially parallel to the upper surface 6. However, as best shown in FIGS. 2 and 3, the gas flows 12a and 12b may be inclined relative to the upper surfaces 6a and 6b of the bodies 2a and 2b, respectively. The gas flows 12a and 12b must be initially sufficiently unattached to the respective upper surfaces 6a and 6b, which is necessary for the formation of the respective closed volumes 18a and 18b. The upper surface depicted in 6b shows a curvilinear profile as one means of producing the geometry necessary for formation of the closed volume. Other geometric profiles, including a flat or irregular surface, may be employed for this purpose. Development of a substantially closed volume and resulting primary flow deflection may be accomplished without requiring the primary flow 12 to reach beyond all points on the periphery of all surface shapes.

FIGS. 4 THROUGH 8

The lift-producing device R is preferably used in an aircraft to provide the aircraft with vertical and horizontal flight capabilities similar to a helicopter.

Figure 4:
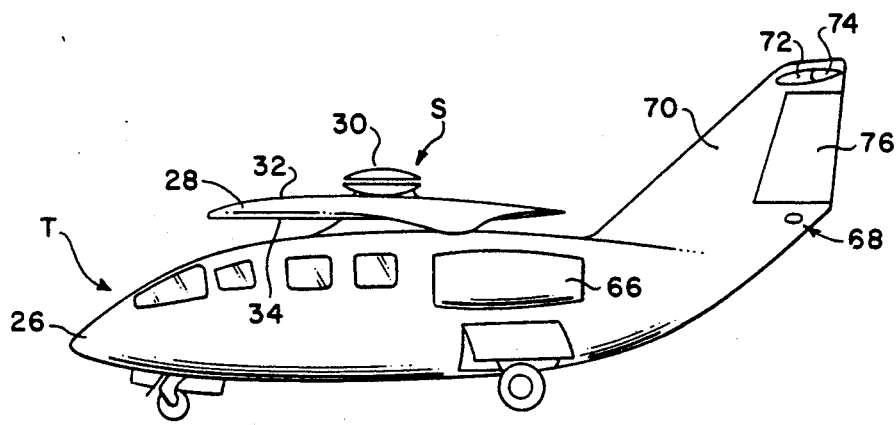
FIG. 4 is a side elevational view of an aircraft utilizing the present invention.

A lift-producing device S, similar to the device R, is preferably disposed above a fuselage 26 of an aircraft T, as best shown in FIG. 4. The device S includes a body 28, a nozzle body 30 and various control means necessary for the normal operation of the aircraft T, as will be fully described below. It should be understood by a person skilled in the art that the application of some or certain combinations or all of the control means to be described below will be dictated by each specific application.

An upper surface 32 and a lower surface 34 of the body 28 define an airfoil profile for providing lift during the horizontal flight mode of the aircraft T, as best shown in FIG. 4. Additional lift during horizontal flight may be provided by optional additional wing surfaces 36, as best shown in FIG. 5, and/or by incorporating a lift producing shape in the fuselage 26, or by incorporating the fuselage 26 and body 28 into a blended wing-fuselage configuration such as that known to the person skilled in the art as a flying wing, etc.

The nozzle body 30 includes a nozzle head 38 which includes a variable outlet 40, as best shown in FIG. 6. A sealed movable slip joint 42 between a central portion 44 and an outer portion 46 allows for the adjustment of the outlet 40, thereby altering the energy of the gas flow 48. Other adjustable means known to the person skilled in the art may be used for variable adjustment of the outlet 40. The flow characteristics of portions of the gas flow within the distribution pattern are variable by means of selectively inclining the upper portion 47 of the nozzle head 38 at an angle with respect to the lower portion 49, or by other means known to a person skilled in the art. The distance, generally indicated by 50, between the nozzle outlet 40 and the upper surface 32 is adjustable by means of a sealed movable slip joint 52 between the nozzle head assembly 38 and a nozzle housing 54, or other adjustable means known to a person skilled in the art. The nozzle body 30 includes a gimbals-type support 56 or other flexible attachment known to the person skilled in the art to allow inclination of the gas flow 48 relative to the upper surface 32.

The nozzle body 30 includes a valve 58 or other means (not shown) known to a person skilled in the art for metering the gas supply flow to provide means for modulating the gas flow 48 from the outlet 40. Alternatively, the nozzle head 38 may be adjusted to vary the area of the outlet 40, for the same purpose. Alternatively, a flexible structure may be incorporated into the periphery of the upper portion 47 of the nozzle head 38 and/or lower portion 49 to vary the area of the outlet 40, for the same purpose, and to selectively vary the angular inclination of the nozzle outlet.

The variable outlet 40, the variable distance 50 between the outlet 40 and the upper surface 32, the gas flow valve 58 and the variable angular inclination of the nozzle outlet 40 relative to the upper surface 32 serve to vary the thermodynamic characteristics (temperature, pressure, velocity, mass flow rate, etc.) of the total flow 48 and/or the pattern of discharge from the nozzle head 38 to modulate the amount of lift generated by the device S. Thus, the flow characteristics of the lift producing gas flow 48 are suitably modulated to obtain controllable, variable lift, as required, for various flight regimes such as ascending, hovering, slow flight and descending in the vertical flight mode and for transition to and from the horizontal flight mode.

Selective movement of the nozzle head 38 and the nozzle body 30 to incline the axis of flow asymmetrically with respect to the surface 32 alters the geometric symmetry of the closed volume 64 and thereby the deflection of the gas flow 48 around the body 28, thereby influencing the balance of the lifting forces and providing control of the aircraft T about the pitch and roll axes. Selective variable inclination of the upper portion 47 of the nozzle head 38 relative to the lower portion 49 alters the symmetry of the nozzle outlet 40 about its periphery, thereby modifying flow characteristics of portions within the total gas flow pattern over the surface. Thus, the balance of the lifting forces are affected, providing alternate and/or additional means of control of the aircraft T about the pitch and roll axes.

The body 28 preferably includes combination aileron-/elevator/flaps 60 located at the trailing portion of the periphery of the body 28 to provide control surfaces which operate differentially to influence roll and collectively to influence pitch by altering the symmetry of the gas flow 48 around the periphery of the body 28 and operate conventionally during a horizontal flight mode when the gas flow 48 is not present.

Controllable orifices 62 each with movable door 63 located within the closed volume 64, defined by the gas flow 48 and the upper surface 32, may be selectively opened to allow a metered intrusion of flow 65 into the closed volume 64, as best shown in FIGS. 5, 6 and 7. The operation of the orifices 62 alters the symmetry of the pressure acting on the body 28 and the pattern of the gas flow 48, influencing movement about the pitch and roll axes.

Reaction motor gas jets 68, also known as puffer jets, are disposed on the body 28 and the fuselage 26 for advantageous control of movement of the aircraft T about the roll, pitch and yaw axes, as best shown in FIGS. 4, 5 and 8.

Controllable horizontal flight may be achieved and sustained while remaining in the vertical flight mode as provided by the gas flow 48 and the resulting dynamic reactions described. Horizontal motive power may be obtained solely from horizontal vectors of the vertical lift produced by the described device. Additional and/or alternative horizontal motive power may be provided by other means such as conventional propulsion engines.

The aircraft T includes means for controlling transition to a normal, wing-borne horizontal flight mode during which the flow 48 is substantially diminished or stopped, and for maintaining attitude control during the horizontal flight and subsequent transition back to the vertical flight mode. Preferably, aircraft T includes vertical stabilizer 70, horizontal stabilizer 72, elevator 74, and rudder 76, each of which operates in a manner known to the person skilled in the art. During the transition phase between the vertical and the horizontal flight modes, the gas valve 58 modulates the gas flow 48 for increasing or decreasing lift, as necessary. Alternatively, the nozzle head 38 may be adjusted to vary the area of the outlet 40, for the same purpose. Alternatively, a flexible structure may be incorporated into the periphery of the upper portion 47 of the nozzle head 38 and/or lower portion 49 to vary the area of the outlet 40, for the same purpose. Any or all of the previously mentioned means for flow control and means for creating variable, controllable lift may be employed during this transition phase. The vertical stabilizer 70, the horizontal stabilizer 72, the elevators 74 and the rudder 76 cooperate with the ailerons 37 and/or combination aileron/elevator/flaps 60 in a conventional manner to provide coordinated 3-axis control during the horizontal flight mode and during the transition phase. The attitude of the aircraft may be controlled during the flight transition phase by any combination of the aforementioned vertical and horizontal flight control and lift producing means.

Conventional propulsion engines 66 are operably associated with the aircraft T to provide horizontal motive power and to generate the gas flow 48 necessary for the device S to provide the necessary lift. Other means (not shown), separate from the propulsion engines 66, may be provided to generate the gas flow 48.

In other physical configurations, the fuselage 26 of aircraft T may be blended into the lifting body 28 in such a manner as to comprise and occupy substantially the same geometric volume and surface shape.

FIGS. 9 THROUGH 14

Figure 9:
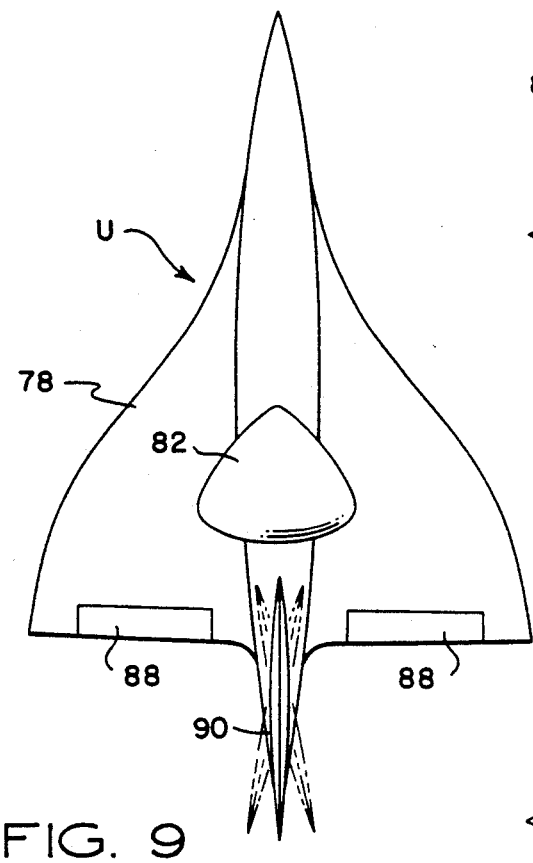
FIG. 9 is a top view of another aircraft utilizing the present invention.
Figure 10:
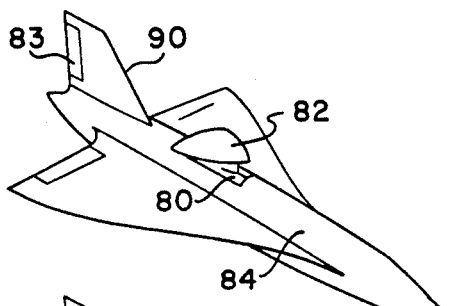
FIG. 10 is a perspective view of the aircraft from FIG. 9, showing a retractable nozzle body of the present invention.
Figure 11:
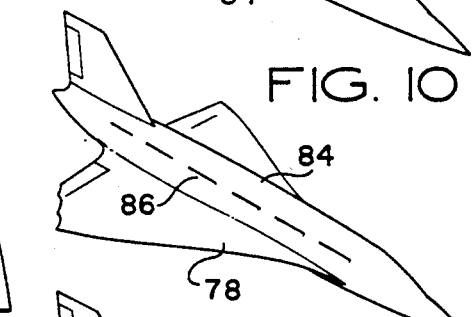
FIG. 11 is a fragmentary, perspective view of the aircraft from FIG. 9, showing a series of orifices in lieu of a nozzle body of the present invention.
Figure 12:
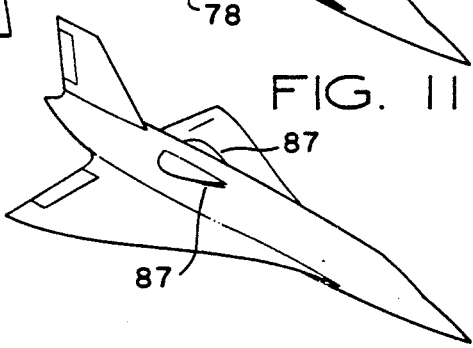
FIG. 12 is a perspective view of the aircraft of FIG. 9, showing a nozzle body incorporated in the fuselage of the aircraft.

Other shapes of the body 28 and fuselage/body mating configurations may be utilized to create the closed volume 64 and the resultant gas flow 48 for generating the lift. Aircraft U utilizes a combination curvilinear and rectilinear shape for the lifting body 78. This shape preferably comprises a low-wing or midwing/modified delta lifting body in order to achieve the known aerodynamic benefits of this configuration during normal horizontal flight, as best shown in FIGS. 9, 10 and 11. The aircraft U preferably includes storage doors 80 for retracting the nozzle body 82 out of the airstream and into the fuselage 84 in order to lessen drag during normal horizontal flight, as best shown in FIG. 10. The nozzle body 82 may have an aerodynamic shape appropriate to high speed flight, or may be replaced by orifices 86 disposed along opposite sides of the fuselage 84, as long as the enclosed volume generated by the gas flow of the nozzle body 82 and the upper surface of body 78 is developed as best shown in FIG. 11. The nozzle body 82 may be replaced by a nozzle body 87 incorporated into the shape of the fuselage, as best shown in FIG. 12.

Aircraft U includes movable horizontal control surfaces 88 and movable vertical control surfaces 83 and 90, as best shown in FIGS. 9 and 10. Control surfaces 88 would be similar to the ailerons or combination flight control surfaces 60 of aircraft T in controlling the geometry of the gas flow generated by the nozzle body 82 and functioning in a conventional manner during horizontal flight when the gas flow is absent. Pivotable control surface 90 also alters the geometry of the gas flow from the nozzle body 82, thus modifying the lifting forces generated by the gas flow, controlling movement about the vertical axis, and functioning in a conventional manner as a stabilizer with rudder 83 during horizontal flight when the gas flow is absent.

Figure 14:
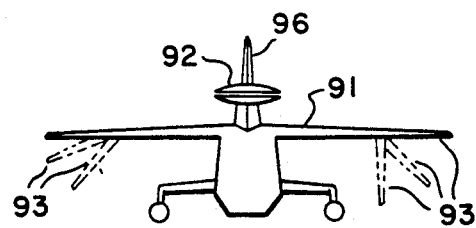
FIG. 14 is a schematic, front elevational view of the aircraft from FIG. 13.
Figure 13:
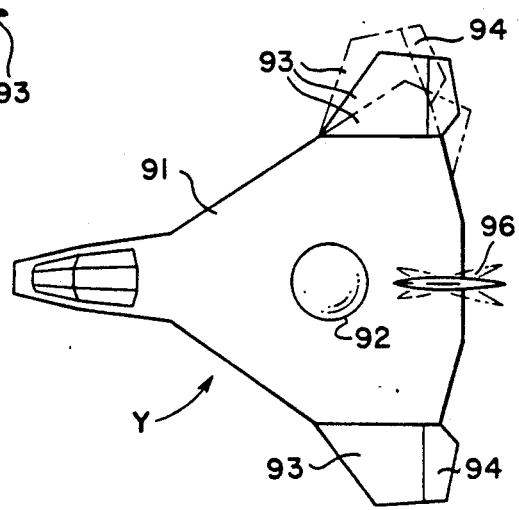
FIG. 13 is a top view of yet another aircraft utilizing the present invention and showing movable wing surfaces.

The lifting body 78 of aircraft U may be modified into other forms. As best shown in FIG. 13, aircraft Y includes a rectilinear-shaped wing/lifting body 91. Movable wing surfaces 93 and control surfaces 94 serve as combination lifting body/flight control surfaces by operating differentially and/or collectively to vary the geometry of the lifting body 91; vary the geometry and/or symmetry of the closed volume; and deflect the flow impinging on the surfaces 93 and 94 to both modulate the lift produced and control movement about the roll, pitch and yaw axes. During horizontal flight when the gas flow is absent, movable surfaces 93 operate as combination wing/stabilizer/flight control surfaces, as best shown in FIG. 14. Movable wing surfaces 93 and control surfaces 94 operate differentially or collectively during horizontal flight in a conventional manner to control the aircraft Y about the roll, pitch and yaw axes, as best shown in FIG. 14. Movable surfaces such as that depicted by 93 may be configured to pivot about any hinge point or rotate about any axis to accomplish the function of variable geometry lifting body and/or flight control surface as partially illustrated by FIGS. 13 and 14. A vertically pivotable control surface 96 alters the geometry of the gas flow from the nozzle body 92, thereby modifying the lifting forces generated by the gas flow, controlling movement about the vertical axis, and functioning in the conventional manner as a stabilizer/rudder in the horizontal flight mode.

From the foregoing, it is seen that the device S permits an aircraft to operate in the manner of a helicopter, but without the rotating rotors and the attendant hazards and mechanical complexities associated with rotary-winged aircraft. Providing an aircraft with capabilities similar to a helicopter is only one of many possible applications of the present invention. The present invention has applicability in all fluids, including water, for powering other devices, such as windmills, boats, and other types of ground and water engaging vehicles, or to move fluid.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention or the limits of the appended claims.

I claim:

1. A thrust-producing device, comprising:
   (a) a body having a surface and a periphery;
   (b) said surface and periphery being disposed in a first fluid;
   (c) means for imparting energy to a second fluid;
   (d) means operably associated with said energy imparting means, disposed adjacent said surface, for distributing said second fluid in a first stream over and adjacent said surface for blanketing and enclosing at least a portion of said surface with said first stream and causing said first stream to be initially sufficiently unattached to said surface to define a substantially closed volume, relative to the first fluid, between said at least a portion of said surface and said first stream;
   (e) means operably associated with said distributing means for imparting sufficient velocity to said first stream for permitting a substantial portion of said first stream to reach beyond at least a portion of said body periphery and to partially evacuate by entrainment said volume and to create a low pressure within said volume relative to a pressure of said first fluid and to generate a second stream within said volume;
   (f) said first stream remaining substantially unattached to said surface prior to reaching said at least a portion of said body periphery;
   (g) whereby at least a substantial portion of said first stream is deflected angularly around at least a portion of said body by the dynamic interaction of said first stream with the first fluid and the second stream and the low pressure within said volume, and whereby said at least a substantial portion of said first stream entrains a portion of the first fluid to produce a combined resultant fluid flow, thereby creating a resultant thrust force acting on said body.

2. A thrust-producing device. as in claim 1, and including:
   a) means for controlling said first stream.

3. A thrust-producing device, as in claim 2, wherein:
   a) said controlling means includes movable surfaces disposed on said body surface.

4. A thrust-producing device, as in claim 2, wherein:
   a) said controlling means includes variable apertures disposed on said body surface.

5. A thrust-producing device, as in claim 2, wherein:
   a) said controlling means includes means for altering the geometry of said body.

6. A thrust-producing device, as in claim 2, wherein:
   a) said controlling means includes means for varying the inclination of said first stream relative to said surface.

7. A thrust-producing device, as in claim 2, wherein:
   a) said controlling means includes means for varying the distance between said first stream and said surface.

8. A thrust-producing device, as in claim 2, wherein:
   a) said controlling means includes means for varying the flow rate of said first stream.

9. A thrust-producing device, as in claim 1, wherein:
   (a) said distributing means includes means for directing said first stream in an arc.

10. A thrust-producing device, as in claim 9, wherein:
    (a) said arc is 360 degrees.

11. A thrust-producing device as in claim 1, wherein:
(a) said distributing means includes means for directing said first stream in a substantially unidirectional flow.

12. A vehicle comprising:
(a) a housing;
(b) means associated with said housing for controlling direction of the vehicle during travel;
(c) a thrust-producing system disposed in a first fluid and operably associated with said housing;
(d) said system having a surface and a periphery;
(e) means operably associated with said system for imparting energy to a second fluid;
(f) means operably associated with said energy imparting means, disposed adjacent said surface, for distributing said second fluid in a first stream over and adjacent said surface for blanketing and enclosing at least a portion of said surface with said first stream and causing said first stream to be initially sufficiently unattached to said surface to define a substantially closed volume, relative to the first fluid, between said at least a portion of said surface and said first stream;
(g) means operably associated with said system for controlling said first stream;
(h) means operably associated with said distributing means for imparting sufficient velocity to said first stream for permitting a substantial portion of said first stream to reach beyond at least a portion of said periphery and to partially evacuate by entrainment said volume and to create a low pressure within said volume relative to a pressure of said first fluid and to generate a second stream within said volume;
(i) said first stream remaining substantially unattached to said surface prior to reaching said at least a portion of said periphery;
(j) whereby at least a substantial portion of said first stream is deflected angularly around at least a portion of said thrust-producing system by the dynamic interaction of said first stream with the first fluid and the second stream and the low pressure within said volume, and whereby said at least a substantial portion of said first stream entrains a portion of the first fluid to produce a combined resultant fluid flow, thereby creating a resultant thrust force acting on said system and said housing.

13. A vehicle as in claim 11, wherein:
(a) said vehicle is an aircraft.

14. A vehicle as in claim 13, wherein:
(a) said aircraft includes wing surfaces.

15. A vehicle as in claim 13, wherein:
(a) said surface is disposed substantially horizontally for providing vertical lift force.

16. A vehicle as in claim 13, wherein:
(a) said surface is disposed substantially vertically for providing a horizontal thrust force.

17. A vehicle as in claim 13, wherein:
(a) said periphery is curvilinear in shape.

18. A vehicle as in claim 13, wherein:
(a) said periphery is rectilinear in shape.

19. A vehicle as in claim 13, wherein:
a) said periphery is a combined curvilinear and rectilinear in shape.

20. A vehicle as in claim 13, wherein:
a) said system includes an airfoil cross-section for providing lift to the aircraft during normal horizontal flight.

21. A vehicle as in claim 13, wherein:
a) said first stream controlling means includes means for varying the flow rate of said first stream.

22. A vehicle as in claim 13, wherein:
a) said first stream controlling means includes means for varying the inclination of the axis of said first stream relative to said surface.

23. A vehicle as in claim 22, wherein:
a) said varying means includes a gimbals.

24. A vehicle as in claim 13, wherein:
a) said first stream controlling means includes means for varying the distance between the axis of said first stream and said surface.

25. A vehicle as in claim 13, wherein:
a) said first stream controlling means includes means for varying the flow characteristics of at least a portion of said first stream.

26. A vehicle as in claim 13, wherein:
a) said first stream controlling means includes movable surfaces disposed on said surface.

27. A vehicle as in claim 26, wherein:
a) said movable surfaces includes pivotable surfaces.

28. A vehicle as in claim 13, wherein:
a) said first stream controlling means includes variable apertures disposed on said surface.

29. A vehicle as in claim 13, wherein:
a) said first stream controlling means includes movable surfaces disposed on said housing.

30. A vehicle as in claim 13, wherein:
a) said first stream controlling means includes means for altering the geometry of said periphery.

31. A vehicle as in claim 13, and including:
a) means for retracting said distributing means into the aircraft.

32. A vehicle as in claim 13, wherein:
a) said housing includes at least a wing surface on each side of said housing; and
b) said distributing means includes orifices along portions of said housing above each of said at least a wing surface.

33. A vehicle as in claim 13, wherein:
a) said distributing means includes means for varying the discharge flow pattern of said first stream.

34. A vehicle as in claim 13, wherein:
a) said housing includes motive means.

35. A vehicle as in claim 13, wherein:
a) said system includes motive means.

36. A vehicle as in claim 13, wherein:
a) said system includes control surfaces for flight control.

37. A vehicle as in claim 36, wherein:
(a) said control surfaces includes movable surfaces.

38. A method for providing thrust for a body which includes a surface having a periphery, said body being disposed in a first fluid under pressure, said method comprising the steps of:
(a) imparting energy to a second fluid;
(b) distributing said second fluid in a first stream over and adjacent a surface of a body for blanketing and enclosing at least a portion of said surface with said first stream and causing said first stream to be initially sufficiently unattached to said surface to define a substantially closed volume, relative to the first fluid, between said at least a portion of said surface and said first stream;
(c) imparting sufficient velocity to said first stream for permitting a substantial portion of said first stream to reach beyond at least a portion of said body periphery and to partially evacuate by entrainment said volume and to create a low pressure within said volume relative to a pressure of said first fluid and to generate a second stream within said volume, said first stream remaining substantially unattached to said surface prior to reaching said at least a portion of said body periphery;

(d) whereby at least a substantial portion of said first stream is deflected angularly around at least a portion of said body by the dynamic interaction of said first stream with the first fluid and the second stream and the low pressure within said volume, and whereby said at least a substantial portion of said first stream entrains a portion of the first fluid to produce a combined resultant fluid flow, thereby creating a resultant thrust force acting on said body.

39. A method, as in claim 38, and including the step of:
(a) altering the geometry of said volume for modulating the thrust generated by said first stream.

40. A method, as in claim 38, and including the step of:
(a) throttling said first stream for modulating the thrust generated by said first stream.

41. A method, as in claim 38, and including the step of:
(a) selectively altering the flow characteristics of portions of said first stream for controlling the balance of thrust generated by said first stream.

42. A method for deflecting a fluid flow in an ambient fluid envelope comprising the steps of:
(a) providing a body having a surface and a periphery;
(b) generating a fluid flow having sufficient energy to reach beyond at least a portion of said periphery of said body;
(c) distributing said fluid flow over said surface for blanketing and enclosing at least a portion of said surface with said fluid flow;
(d) positioning said fluid flow so that said fluid flow is adjacent and initially sufficiently unattached to said surface, thereby defining a substantially closed volume, relative to the ambient fluid, between said fluid flow and said at least a portion of said surface;
(e) partially evacuating the fluid within said volume, thereby creating low pressure within said volume;
(f) allowing said fluid flow to reach beyond said at least a portion of said periphery, said fluid flow remaining substantially unattached to said surface prior to reaching said at least a portion of said periphery;
(g) whereby at least a substantial portion of said fluid flow is deflected angularly around at least a portion of said body by the dynamic interaction of said fluid flow with the ambient fluid and the fluid within said volume.

43. A thrust-producing device, comprising:
(a) a body having a surface and a periphery;
(b) said surface and periphery being disposed in a first fluid;
(c) means for imparting energy to a second fluid;
(d) means operably associated with said energy imparting means, disposed above said surface, for distributing said second fluid in a first stream over and adjacent said surface for blanketing and enclosing at least a portion of said surface with said first stream and causing said first stream to be initially sufficiently unattached to said surface to define a substantially closed volume, relative to the first fluid, between said at least a portion of said surface and said first stream;
(e) means operably associated with said distributing means for imparting sufficient velocity to said first stream for permitting a substantial portion of said first stream to reach beyond at least a portion of said body periphery and to partially evacuate by entrainment said volume and to create a low pressure within said volume relative to a pressure of said first fluid and to generate a second stream within said volume;
(f) whereby at least a substantial portion of said first stream is deflected angularly around at least a portion of said body by the dynamic interaction of said first stream with the first fluid and the second stream and the low pressure within said volume, and whereby said at least a substantial portion of said first stream entrains a portion of the first fluid to produce a combined resultant fluid flow, thereby creating a resultant thrust force acting on said body.

44. A method for providing thrust for a body which includes a surface having a periphery, said body being disposed in a first fluid under pressure, said method comprising the steps of:
(a) imparting energy to a second fluid;
providing means disposed above a surface of a body for distributing said second fluid in a first stream over said surface;
(c) distributing said second fluid in said first stream over and adjacent said surface for blanketing and enclosing at least a portion of said surface with said first stream and causing said first stream to be initially sufficiently unattached to said surface to define a substantially closed volume, relative to the first fluid, between said at least a portion of said surface and said first stream;
(d) imparting sufficient velocity to said first stream for permitting a substantial portion of said first stream to reach beyond at least a portion of said body periphery and to partially evacuate by entrainment said volume and to create a low pressure within said volume relative to a pressure of said first fluid and to generate a second stream within said volume;
(e) whereby at least a substantial portion of said first stream is deflected angularly around at least a portion of said body by the dynamic interaction of said first stream with the first fluid and the second stream and the low pressure within said volume, and whereby said at least a substantial portion of said first stream entrains a portion of the first fluid to produce a combined resultant fluid flow, thereby creating a resultant thrust force acting on said body.

* * * * *

UNITED STATES PATENT AND TRADEMARK OFFICE
CERTIFICATE OF CORRECTION

PATENT NO. : 5,031,859

DATED : July 16, 1991

INVENTOR(S) : John T. Cunningham

It is certified that error appears in the above-identified patent and that said Letters Patent is hereby corrected as shown below:

Column 3, line 25 should read as --may be the same as that comprising the ambient--.

Claim 13, column 9, line 48 should read as --13. A vehicle as in claim 12, wherein--.

Claim 44, column 12, line 35 should read as --(b) providing means disposed above a surface of a body--.

Sheets 1 and 2 of the drawings should be deleted to be replaced with the correct renumbered sheets of drawings as shown on the attached pages.

Signed and Sealed this

Ninth Day of March, 1993

*Attest:*

STEPHEN G. KUNIN

*Attesting Officer*     *Acting Commissioner of Patents and Trademarks*

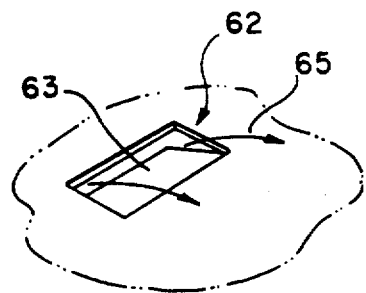
FIG. 7
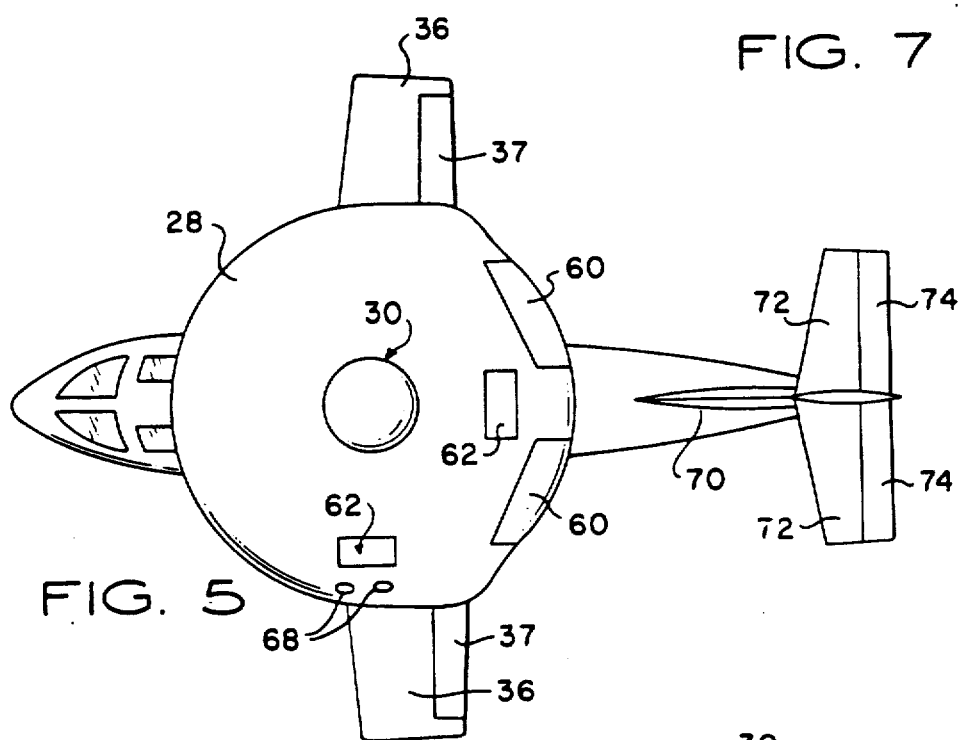
FIG. 5
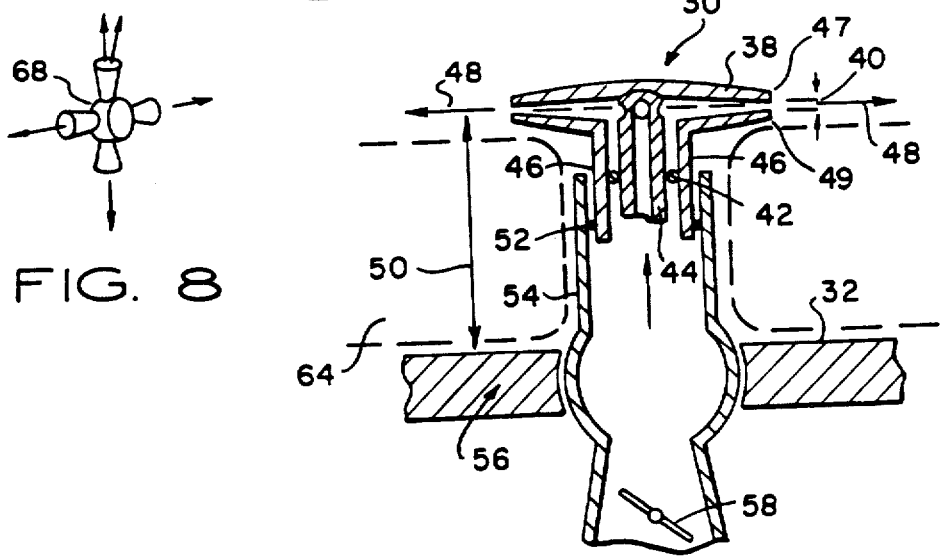
FIG. 8
FIG. 6

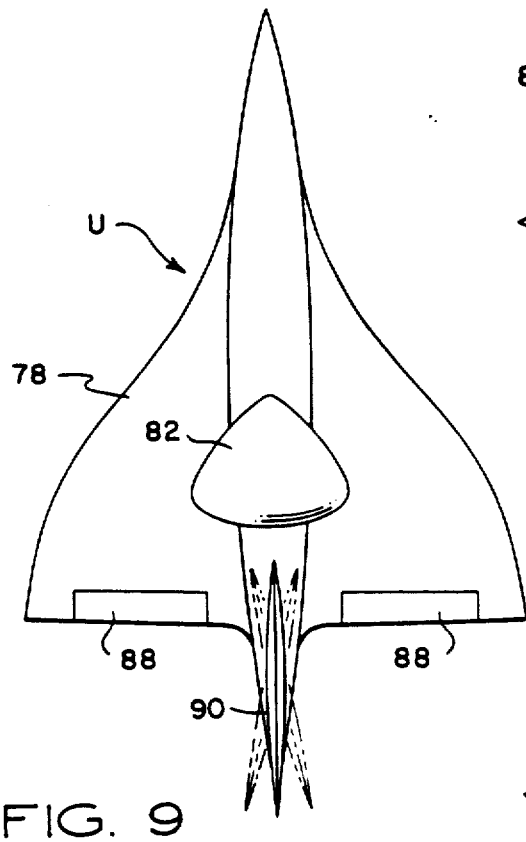
FIG. 9
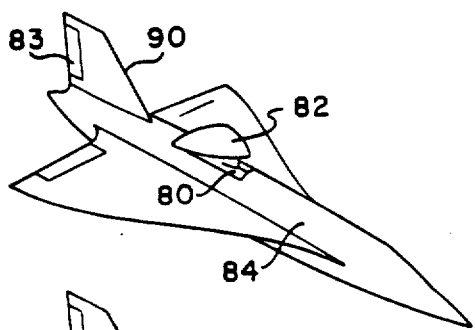
FIG. 10
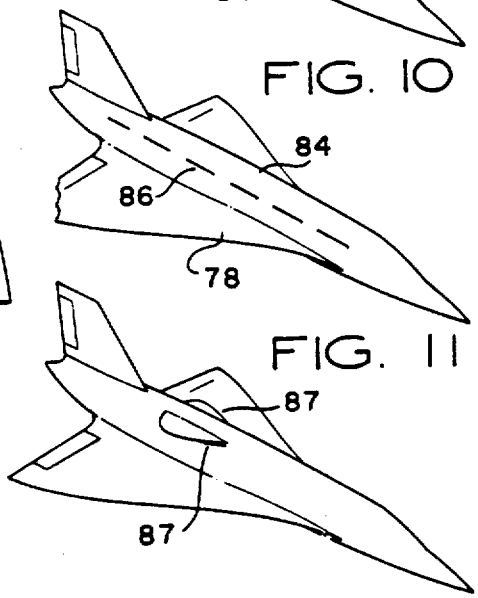
FIG. 11
FIG. 12
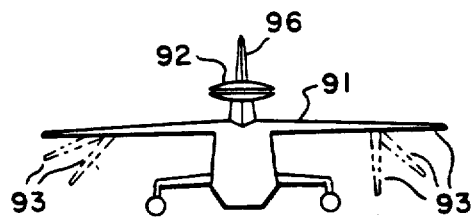
FIG. 14
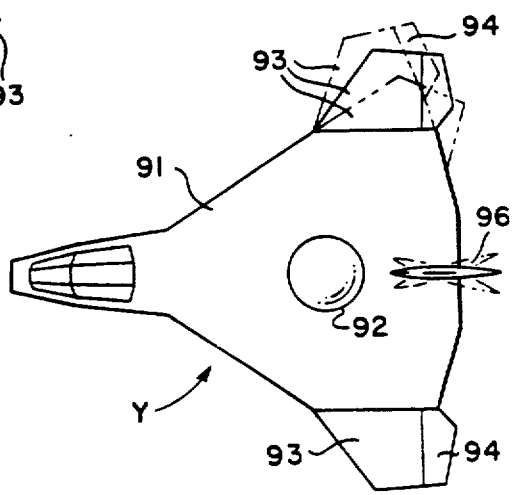
FIG. 13